United States Patent [19]

Kornahrens

[11] 4,260,173
[45] Apr. 7, 1981

[54] LIQUID FIFTH WHEEL ASSEMBLY INCLUDING DUAL CONCENTRIC PIPING STRUCTURE

[75] Inventor: Herman Kornahrens, West Islip, N.Y.
[73] Assignee: Garsite Products, Inc., Deer Park, N.Y.
[21] Appl. No.: 19,265
[22] Filed: Mar. 9, 1979
[51] Int. Cl.³ .............................................. B60D 1/08
[52] U.S. Cl. ............................... 280/421; 280/438 A; 285/134
[58] Field of Search ........... 280/420, 421, 422, 423 R, 280/5 R, 5 C, 433, 403, 438 A; 285/133, 134, 136; 137/615; 222/625, 626, 609, 610

[56] References Cited

U.S. PATENT DOCUMENTS

| | | | |
|---|---|---|---|
| 569,924 | 10/1896 | Jones | 285/134 |
| 1,925,091 | 9/1933 | Crossen | 285/134 |
| 1,982,052 | 11/1934 | Hennessy | 280/5 C |
| 2,717,166 | 9/1955 | Hedden | 285/134 |
| 3,598,427 | 10/1971 | Lavery | 280/433 |
| 4,149,732 | 4/1979 | Watkins | 280/415 B |

Primary Examiner—John J. Love
Assistant Examiner—Randall A. Schrecengost
Attorney, Agent, or Firm—Philip D. Amins

[57] ABSTRACT

The present invention pertains to a liquid fifth wheel assembly for use with tractor and trailer combinations wherein the trailer includes a tank body for the storage and transportation of fluids, and the tractor includes a pumping station adapted to deliver the fluid stored in the tank. The fifth wheel assembly which is secured to the under side of the trailer has a central opening therein through which passes an enclosed dual concentric suction and discharge pipe structure interconnecting the tank and the pump station; the pipe structure including a swivel joint for permitting angular displacement of a portion of the enclosed pipe.

39 Claims, 5 Drawing Figures

LIQUID FIFTH WHEEL ASSEMBLY INCLUDING DUAL CONCENTRIC PIPING STRUCTURE

BACKGROUND OF THE INVENTION

1. Field of the Invention

The present invention pertains to a liquid fifth wheel assembly for use in conjunction with tractor-trailer combinations and, more particularly, to a dual concentric suction and discharge pipe structure in a liquid fifth wheel assembly that is positionally secured to the underside of a trailer and which liquid fifth wheel assembly need not be removed when separating the trailer and the tractor.

2. Description of the Prior Art

Heretofore, fifth wheel assemblies for connecting tractors and trailers have almost universally employed king pin connections. In cases where a liquid fifth wheel has been required, it has been necessary to dismantle the fifth wheel assembly in order to disengage the tractor from the trailer. The necessity of disassembling the prior art liquid fifth wheel assemblies to disengage the tractor from the trailer has required much time and accompanying expense along with the increased propensity for damaging the parts of the liquid fifth wheel assembly due to the constant assembling and disassembling thereof.

There are several issued U.S. Patents which pertain generally to subject matter comprising the present invention. For example, U.S. Pat. No. 3,711,122 granted to Holmberg et al. discloses a tractor semi-trailer coupling mechanism in which the coupling member secured to the tractor comprises a hollow locking bolt and the king pin in the coupling member secured to the semi-trailer is hollow for engagement of the locking bolt in the king pin or vice-versa, the hollow king pin in at least an upper portion thereof being adapted to receive a connector member with connecting means for electrical power lines, pneumatic power lines and/or hydraulic lines leading from the tractor to the semi-trailer. The hollow locking bolt comprises a connector member complimentary to the first connector member and having connecting means for feed lines from the tractor to the semi-trailer. As it pertains to the present invention Holmberg et al. teach the use of two airlines extending through the fifth wheel. However, as will be apparent from the following disclosure, the Holmberg et al. patent does not disclose or suggest the subject matter of the present invention.

Another example of the prior art is disclosed in U.S. Pat. No. 3,888,513 granted to Pilz et al. This second U.S. patent teaches a service line coupling arrangement by which air and electrical service lines of the tractor are coupled to corresponding air and electrical servical lines of a trailer upon movement of a tractor into drivable interconnection with the trailer. More particularly, the Pilz et al. patent discloses mating male and female service line coupling members which are mounted one on the tractor and one on the front wall of the trailer for movement into mating interengagement when the tractor and trailer are moved into coupled interconnection. The coupling member carried by the tractor is connected to the air and electrical supply lines of the tractor, and the coupling member carried on the front wall of the trailer is connected to points of delivery of the air or electrical power, such as the air brake units and the lights of the trailer. Therefore, when the male and female coupling members are moved into mating engagement the supply lines of the tractor and the trailer are interconnected independently of any manual coupling operation on the part of the driver of the tractor.

In the Pilz et al. patent, the service line coupling member mounted in the tractor is supported for pivotal movement in opposite directions with respect to the axis of the fifth wheel on the tractor and is further supported for reciprocating movement radially of the fifth wheel axis. The pivotal and reciprocating capability of the coupling member facilitates orientation of the coupling member relative to the mating coupling member on the trailer wall during movement of the tractor into interengagement with the trailer. It will be appreciated that the Pilz et al. patent which discloses multiple passageways extending through the coupling members does not patentably anticipate the present invention.

Another excellent example of the prior art in the field to which the present invention is directed is U.S. Pat. No. 3,598,427 which was assigned to the assignee of the present application. In the prior issued U.S. Patent there is disclosed an improved fifth wheel assembly for a tractor and trailer combination which is substantially entirely secured to the front underside of the trailer during separation and connection of the trailer and the tractor and during operation of the tractor and the trailer combination. The fifth wheel assembly includes means disposed on the tractor which are adapted to receive the fifth wheel assembly that is secured to the underside of the trailer in bearing engagement. Means are further provided for positionally securing the fifth wheel assembly on the underside of the trailer with respect to means disposed on the tractor which receives substantially none of the shear forces that are presented to the fifth wheel assembly. In the prior issued patent, the fifth wheel assembly which is secured to the underside of the trailer comprises upper and lower mounting plates, an annular ball bearing assembly disposed between the mounting plates and secured therebetween, a subframe member having an upper mounting bracket secured thereto and descending therefrom and adapted to be placed in bearing engagement with a lower mounting bracket secured to the tractor. A central opening is provided in the entire assembly through which passes an enclosed pipe structure that inter-connects the tank and the pump station with the pipe structure including a swivel joint for permitting limited angular displacement of one portion of the pipe structure housing.

There are many advantages to the construction disclosed in the aforementioned U.S. Patent. Initially, direct transmission of liquids from the tank to the product pump on the tractor is permitted. The need for overhead jumper hoses or trailer hose connections is obviated and pump suction problems are minimized while at the same time pump life is extended.

In spite of the foregoing advantages, it has been found that several improvements can be made in the construction exemplified by the aforementioned U.S. Patent. For example, in the previously issued U.S. Patent a single swivel joint was used for suction purposes from the tank to a pump on the vehicle tractor. The discharge from the pump, was piped to and through filtration, metering and dispensing equipment on the tractor. Due to the limited space on the tractor, usually a discharge hose was run as a jumper hose from the tractor to the trailer wherein the filtration metering and dispensing equipment was more conveniently arranged. However, the jumper hose was subject to damage and deterioration. It is to improvements along the foregoing lines that the present invention is directed. For example, and as will be explained more fully hereinafter, the present invention utilizes a dual concentric swivel wherein both suction and discharge can be ducted through the center of the fifth wheel. The ancillary equipment for filtration, metering, pressure controls is on the trailer in any convenient arrangement and location.

SUMMARY OF THE INVENTION

In its broadest aspect, the present invention provides a liquid fifth wheel assembly which has inlet and outlet lines extending therethrough and which is coupled to a pump. Fuel flows through a gravitational siphon feed through the input line within the tank trailer and then is fed to the inlet end or suction side of a pump. The pressurized fluid, which may be jet fuel, is then fed through the outlet line to the rear of the trailer for output dispensing and refueling of a vehicle such as a jet aircraft. Thus, the pump may be operated by means of a tractor engine which is in the front cab. Using 6 inch and 4 inch suction and discharge lines, respectively, 600 gallons can be pumped per minute. For larger aircraft, such as a Boeing 747 or a McDonald Douglas DC-10, 8 inch and 6 inch suction and discharge lines, respectively, would be employed for pumping between 1,000 to 1,200 gallons per minute. The capacity of the tank portion or trailer is in the order of 10,000 to 20,000 gallons and finds particular utility at large airports.

It is therefore the main object of the present invention to provide an improved liquid fifth wheel assembly.

Another important object of the present invention is to provide an improved liquid fifth wheel assembly, as described above, that is used in conjunction with tractor and fluid tank type trailer combinations.

Yet another object of the present invention is to provide an improved liquid fifth wheel assembly, as described above, wherein the assembly is secured to the underside of the trailer at the front thereof even when the trailer is detached from the tractor part of the combination.

It is yet another object of the present invention to provide an improved liquid fifth wheel assembly, as described above, for interconnecting a fluid tank type trailer and a tractor having a pumping station wherein the liquid fifth wheel assembly is formed with a central opening through which passes an enclosed pipe structure containing the suction and discharge lines and which is connected at one end to the fluid tank and at the other end to the pumping station by means of a coupling hose and wherein the piping structure is entirely separate and apart from and in no way connected to, the liquid fifth wheel assembly.

It is still another object of the present invention to provide an improved liquid fifth wheel assembly, as described above, wherein the enclosed piping structure comprises a dual concentric swivel such that both suction and discharge can be ducted through the center of the fifth wheel.

BRIEF DESCRIPTION OF THE DRAWINGS

These and other objects, features and advantages of the present invention will become more apparent from the following detailed description considered in conjunction with the accompanying drawings wherein:

FIG. 5 is a sectional plan view taken along the line 5—5 of FIG. 4.

DETAILED DESCRIPTION OF THE PREFERRED EMBODIMENT

Figure 1:
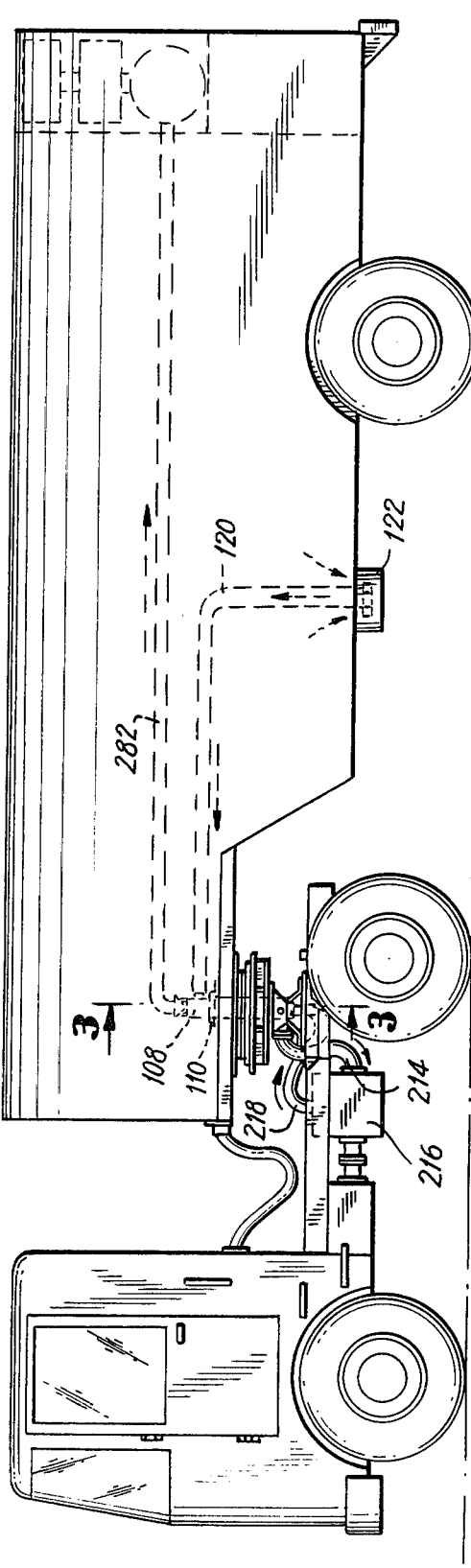
FIG. 1 is a side elevational view illustrating the improved dual concentric liquid fifth wheel assembly comprising the present invention as employed with a tractor-trailer combination.
Figure 3:
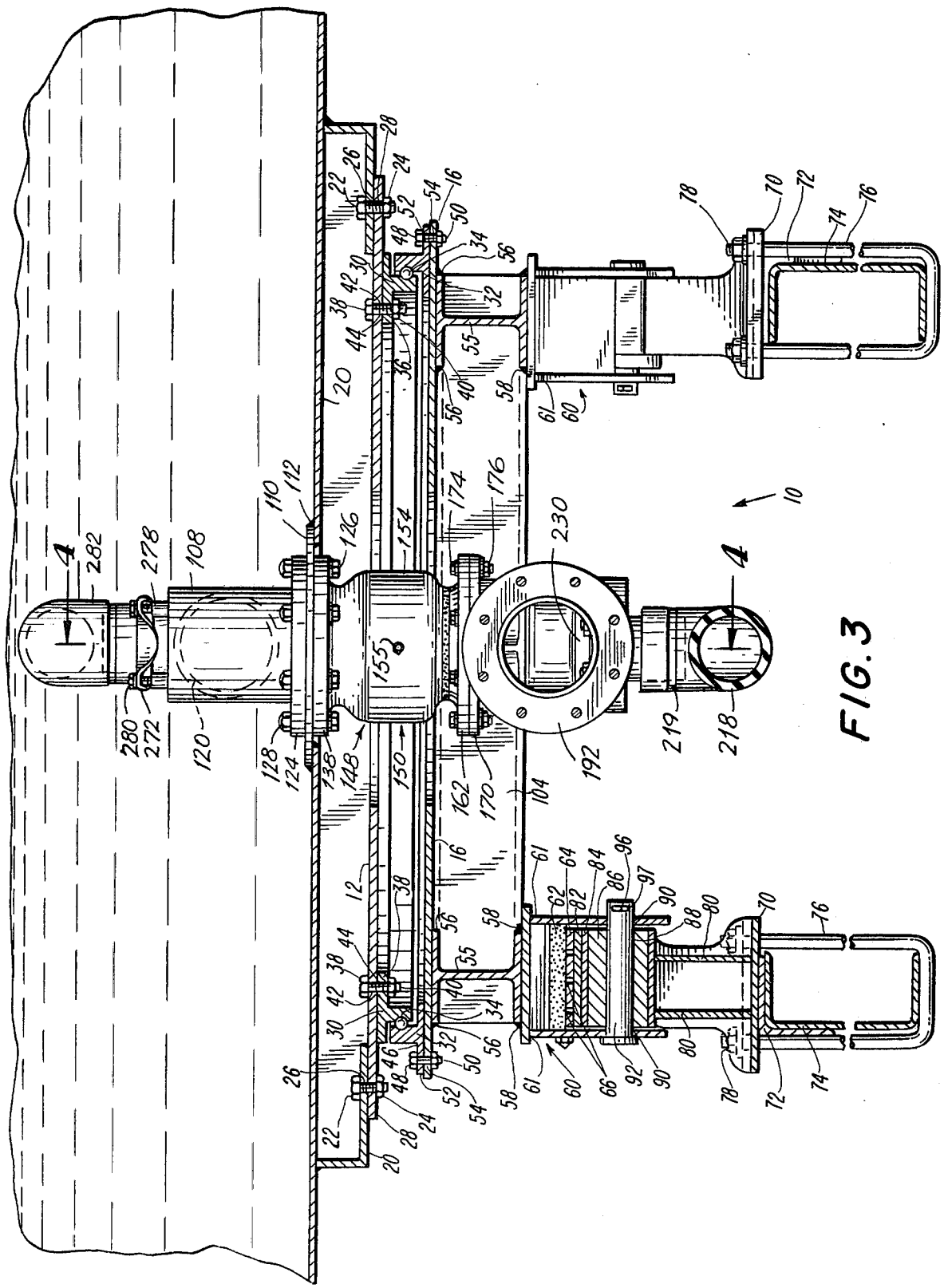
FIG. 3 is a transverse elevational view, partially in section, illustrating the dual concentric swivel assembly comprising the present invention in conjunction with the means for mounting same on a tractor-trailer combination.
Figure 4:
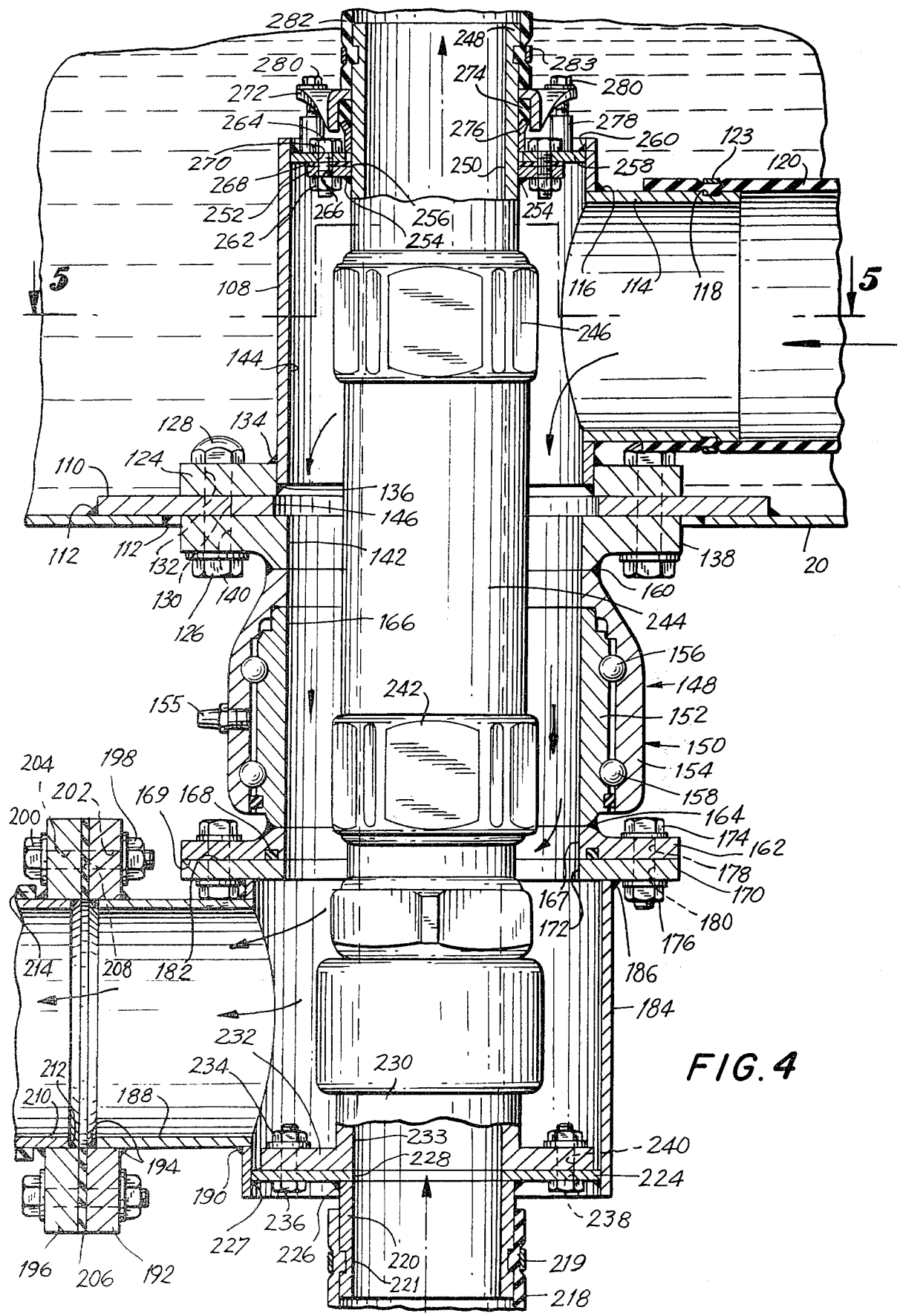
FIG. 4 is a sectional elevational view taken along line 4—4 of FIG. 3.

Referring now to the drawings, and more particularly to FIG. 1 thereof, there is shown the liquid fifth wheel assembly of the present invention which is designated generally by the reference numeral 10. As can best be seen by reference to FIG. 3, the assembly 10 includes an upper mounting plate 12, an annular ring bearing 14, a lower mounting plate 16 and a structural subframe 18, all of which are preferrably fabricated from steel. The upper mounting plate 12 is secured to the underside of the trailer chassis 20 at the front end thereof, by means of a plurality of bolts 22 and nuts 24, the bolts 22 passing through holes 26 and 28 formed in the chassis 20 and the upper mounting plate 12, respectively.

The annular ring bearing 14 comprises an inner bearing race 30, an outer bearing race 32 and a plurality of ball bearings 34.

The inner bearing race 30 has an inwardly extending peripheral flange 36 that is secured to the upper mounting plate 12 by means of bolts 38 and nuts 40, the bolts 38 passing through openings 42 and 44 formed in the upper mounting plate 12 and the inwardly extending flange 36, respectively.

The outer bearing race 32 has an outwardly extending peripheral flange 46 and is secured to the lower mounting plate 16 by means of bolts 48 and nuts 50, the bolts 48 passing through openings 52 and 54, in the outwardly extending flange 46 and the lower mounting plate 16, respectively.

Figure 2:
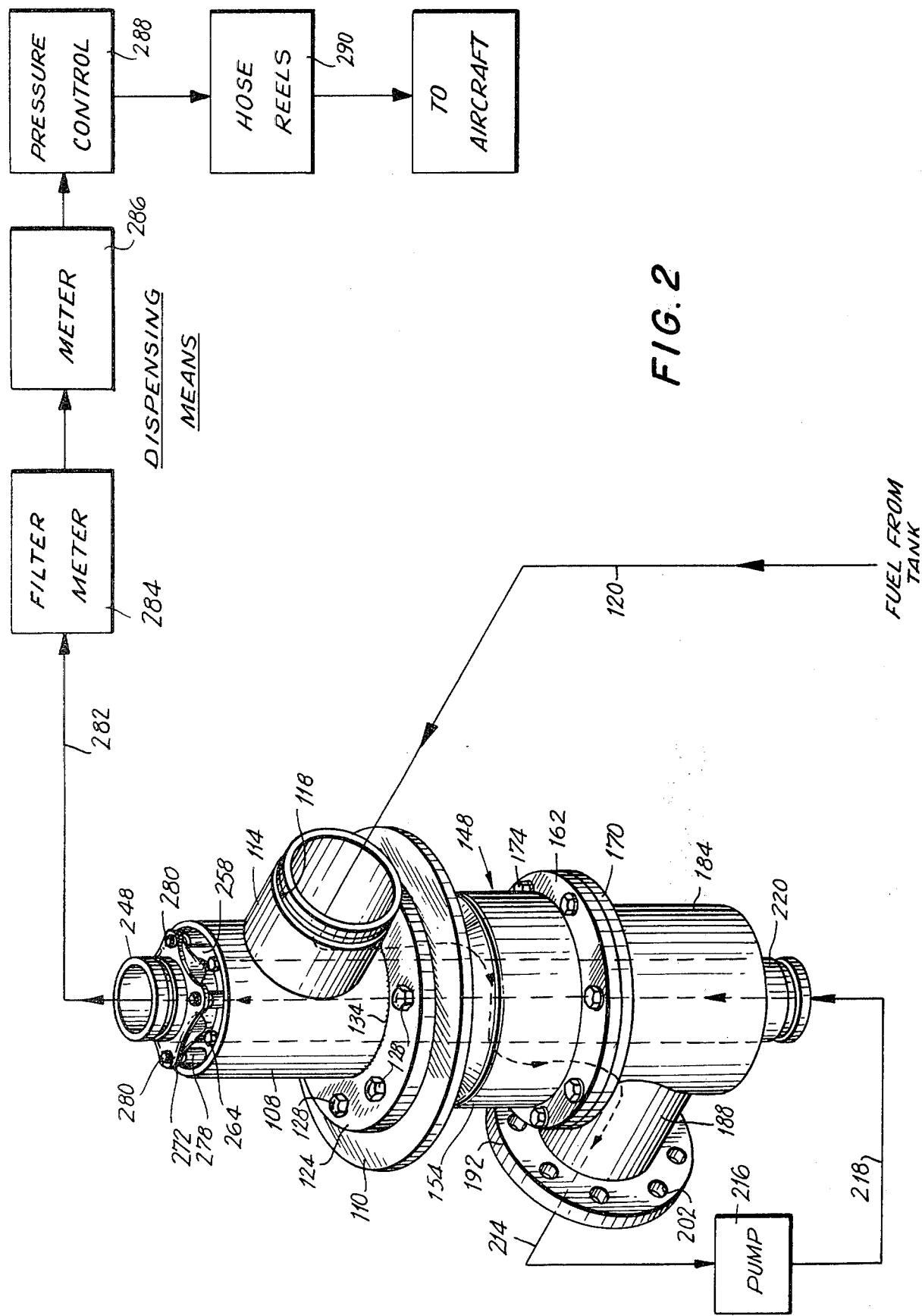
FIG. 2 is a perspective view illustrating the dual concentric swivel assembly comprising the present invention together with a schematic block diagram depicting components associated therewith.

The structural subframe 18 comprises four I-beams 55 which are welded together and which are secured to the lower mounting plate 16, such as by means of welds 56. Also secured to the structural subframe 18 by means of welds 58, are a pair of upper support bearings 60 each having side walls 61 and internal grease retaining chambers 62, as best seen in FIG. 2. The grease retaining chambers define concave, arcuate bearing walls 64 which are lubricated by grease passing from the grease retaining chambers via openings 66 formed in the bearing walls 64, the purpose of which will be described in more detail hereinafter.

The assembly 10 also includes a pair of lower bearing brackets or trunnions 68 which have flanges 69 that are welded to a support plate 70 as at 71. The support plate 70 is in turn welded to a frame bed 72 as at 73. The frame bed 72 itself is secured to the frame rails or chassis 74 of the tractor by means of threaded U-bolts 76 and nuts 78.

The lower bearing brackets or trunnions 68 each have a pair of gusset plates 80 and each includes an upper, arcuate convex bearing wall 82 within which is welded a cylindrical member 84. Disposed within the cylindrical member 84 is a cylindrical shock bushing 86 which is preferably fabricated from a synthetic rubber material and which has a central opening 88 therein.

The upper support bearings 60 have lateral openings 90 formed in both of the side walls 61 thereof. With the upper support bearings placed upon the lower bearing brackets, the bearing walls 64 are in bearing engagement with the bearing walls 82 and the openings 88 and 90 are in axial alignment. The upper support bearings 60 are then positionally secured with respect to the lower bearing bracket 68 by pins 92 having heads 94. The pins 92 pass through the axially aligned openings 88 and 90 and are secured therein by means of cotter-type pins 96 passing through openings 97 in the ends of the pins 98 remote from the heads 94.

It is herein to be noted that although the pins 92 positionally secure the bearings 60 with respect to the brackets 68, they are not subjected to any shear stress. The pins 92 are protected from any vertical shearing or shock forces by the shock bushing 86. The entire bearing force of the rotational movement about the vertical plane of the fifth wheel assembly 10 is borne by the bearing surfaces of the walls 64 and 82 which are lubricated by the grease passing thereto through the grease openings 66 in the walls 64. Of course, rotational movement about the horizontal plane is provided by means of the ring bearing 14.

The upper mounting plate 12 is formed with a central, circular opening 98, the lower mounting plate 16 is formed with a central, circular opening 100 while the annular ring bearing 14 defines a circular opening 102 therethrough. All the openings 98, 100 and 102 are in axial alignment with one another and the openings 98 and 100 are of substantially equal diameter.

The structural subframe 18 defines a rectangular opening 104.

When the members of the assembly are secured to one another as described hereinabove, the upper mounting plate 12, the annular ring bearing 14, the lower mounting plate 16, the structural subframe 18 and the upper support bearings 60 form an integral member which is secured to the front underside 20 of the trailer chassis, whereby substantially the entire liquid fifth wheel assembly is positionally secured with respect to the trailer at the front underside thereof. In this position, the opening 104 in the structural subframe member 18 is in alignment with the axial aligned openings 98, 100 and 102 in the upper mounting plate 12, the lower mounting plate 16 and the annular ring bearing 14, respectively, thereby defining an opening which passes through the entire fifth wheel assembly 10.

As best seen in FIG. 1, the trailer includes a fluid storage tank 106, which tank has a downwardly extending pipe fitting 108 disposed therein in fluid type relationship. The pipe fitting 108 which extends downwardly from the tank near the front underside of the chassis 20 has an external, peripheral flange 110 at the bottom end thereof that is welded at 112 to the tank 106.

For a better understanding of the dual concentric swivel for both suction and discharge, reference may be had to FIG. 2 of the drawing. A nipple 114 is welded at 116 to the pipe 108 and is provided with an annular external groove 118 for receiving thereon a 6 inch diameter suction hose 120 that terminates in a valve sump 122 positioned at the bottom of the tank. Ring clamp 123 secures the hose 120 to the nipple 114. A flange 124 is also secured to the flange 110 by means of nuts and bolts 126 and 128, respectively, that pass through aligned holes 130 and 132 in the flanges 110 and 124, respectively. Welds 134 and 136 are utilized for securing the pipe fitting 108 to the flange 124. Still another flange 138 is secured to the flange 110 by means of the nuts and the bolts 126 and 128, respectively, which bolts 128 also pass through holes 140 that are formed in the flange 138 and which are in alignment with the holes 130 and 132. The inside diameter 142 of the flange 138 is approximately the same as the inside diameter 144 of the pipe fitting 108. Flange 110 also has an opening 146 therethrough which is in alignment with but slightly larger than the openings 142 and 144.

A swivel unit, generally designated by the reference character 148 is comprised of a ball bearing assembly 150 that includes an inner race 152, and an outer race 154 having a grease fitting 155 extending therethrough, and two rows of axially spaced apart ball bearings 156 and 158. The outer race 154 is secured to the flange 138 by means of welds 160. The inner race 152 is secured to a flange 162 by means of a weld 164. The inside diameter 166 of the inner race 152, is substantially the same as the inside diameter of the flange 138 and the inside diameter 167 of the flange 162. A gasket, which may be in the form of an O-ring 168, is provided on the end face 169 of the flange 162.

Another flange 170, having an internal bore 172, is secured to the flange 162 by means of bolts and nuts 174 and 176 which pass through openings 178 and 180 in the flanges 162 and 170, respectively. One transverse face 182 of the flange 178 is in confronting, fluid-tight relationship with the end face 169 of the flange 162 that contains the gasket 168. A length of pipe 184 is welded at 186 to the opposite surface of the flange 170 and has secured thereto a nipple 188 that is held in place by means of a weld 190. A flange 192 is secured by a weld 194 to the opposite end of the nipple 188. Coupled to the flange 192 is another flange 196 that is held in place by means of nuts and bolts 198 and 200 which pass through openings 202 and 204 formed in the flanges 192 and 196, respectively. Intermediate the flanges 192 and 196 there is provided a gasket 206 having a plurality of openings 208 through which the shanks of the bolts 200 pass. A length of pipe 210 is secured to the flange 196 by means of a weld 212. A flexible hose 214 is then secured to the length of pipe 210 in any suitable manner. The other end of the length of hose 214 is suitably coupled to the suction side of a pump 216 which is driven by the transmission of the tractor in a conventional manner. The output or discharge side of the pump 216 is provided with a length of hose 218, the other end of which is retained by a clamp 219 in any suitable manner to a length of pipe 220 having a four inch diameter bore 221 and a flange 224 secured thereto by means of a weld 226. The flange 224 is also secured to the length of pipe 184 by means of a weld 227. The flange 224 has an opening 228 therethrough that is approximately the same size as the inside diameter of the length of pipe 220. A fitting 230, having a flange 232 and an internal bore 233 of approximately four inches in diameter, is secured to the flange 224 by means of nuts and bolts 234 and 236. The shanks of the bolts 236 pass through openings 238 in the flange 224 and 240 in the flange 232.

A lower hose coupling 242 is used to join a length of four inch diameter flexible stainless steel hose 244 to the pipe fitting 230. Similarly, an upper hose coupling 246 couples the length of flexible hose 244 to a pipe 248 having an internal bore 250. The pipe 248 has a flange 252 secured thereto by means of a weld 254. The flange 252, together with a gasket 256 cooperates with a flange 258 that is secured to the pipe 108 by means of a weld 260. Nuts and bolts 262 and 264 pass through openings 266, 268 and 270 in the flange 252, the gasket 256 and the flange 258. There is also provided a dresser style coupling which includes a flange 272 and gaskets 274 and 276. The coupling is held in place by means of posts 278 that are rigidly mounted on the top surface of the flange 258 and by screws or bolts 280 that pass through the flange 272 and are threaded into the posts 278. A flexible hose 282 is clamped by a ring 283 in any suitable manner to the pipe 254 and, as shown in FIGS. 1 and 2, is in serial fluid communication with a filter meter 284, a volumetric meter 286, pressure control means 288 and hose reels 290.

It will be appreciated from the foregoing that the present invention provides a dual concentric swivel wherein both suction and discharge can be ducted through the center of a fifth wheel. The filtration equipment as well as the meters and controls therefor may then be mounted on the trailer in any convenient location. As pointed out hereinabove, the present invention may be used for pumping approximately 600 gallons per minute through a 6 inch diameter suction hose and a 4 inch diameter discharge hose. Alternatively, 1,000 to 1,200 gallons per minute may be pumped utilizing an 8 inch diameter suction hose and a 6 inch diameter discharge hose. This larger size will be more suitable for larger aircraft such as the Boeing 747 and the McDonald Douglas DC-10.

It will be further appreciated that the enclosed dual concentric swivel provides for fluid transmission from the tank portion through the dual concentric swivel and then a pump before exiting through a discharge hose contained within the tank. Although the fluid transmission path and the structure therefor is through the fifth wheel assembly 10, it is completely independent of the assembly itsef and is not connected thereto in any manner.

It is herein to be noted that although many members of the liquid fifth wheel assembly 10 have been described as being welded together, in many instances it is equally suitable to bolt the same together or to use any other suitable connecting means. Similarly, although many members have been described as being bolted together, it would also be possible to weld the same or connect them together by any other suitable connecting means.

It is thus seen that I have provided a new and novel liquid fifth wheel assembly which always remains secure to the trailer and which permits simple and easy fluid transmission from the tank of the trailer to the pump station on the tractor and which permits ease in connecting and separating the tractor-trailer combination. I have also provided a novel dual concentric swivel that permits both suction and discharge to be ducted through the center of the fifth wheel.

Attention is directed to the fact that in some applications it is desirable to provide a safety valve to prevent spilling of the contents of the tank, should there be any type of failure of the liquid fifth wheel or the hoses coupled therewith. In this instance, the assembly can be provided with internal valves which will remain in a normally locked and closed position during transit of the tractor trailer. These valves can then be unlocked after the tractor trailer has been halted and has been placed in refueling position with regard to the aircraft or the refueling hydrant. In this regard, the internal valves may be of the automatic or manual operational type, whereby upon cessation of movement of the tractor trailer by disengagement of the gears the internal valves can become operational. However, attention is directed to the fact that difficulties may ensue in an automatic operational internal valve device due to the fact that the tractor trailer may be in a standstill position and the gears in a neutral position, even though the tractor trailer assembly is not in a completely stationary refueling attitude. Therefore, the manual or semi-automatic internal valve release mechanism is deemed to be superior due to the fact that the engine is in an "on" position when the refueling is taking place.

While I have shown and described the preferred embodiment of my invention, there are many modifications, changes, and improvements which may be made therein by those skilled in the art without departing from the spirit and scope thereof, as defined in the appended claims.

What is claimed is:

1. In a tractor and a fluid containing trailer combination having a fifth wheel assembly substantially entirely secured to the front underside of the trailer during separation and connection of the trailer tractor and during operation of said tractor and said trailer combination in conjunction with a utilization device, the improvement comprising housing means mounted within the fifth wheel assembly and coupled to the trailer, fluid inlet and fluid outlet means disposed within said housing means and in communication with said trailer, a bore through said housing, a length of pipe having inlet and outlet means, said pipe extending through said bore in said housing and defining, in combination with said bore, an annular flow chamber for the passage of fluid from said housing inlet means to said housing outlet means, pump means having suction and discharge sides, first hose means for fluidly coupling said housing outlet means to said suction side of said pump means, second hose means for fluidly coupling said discharge side of said pump means to said inlet means of said pipe, and third hose means adapted for fluidly coupling said pipe outlet means to the utilization device.

2. A tractor and trailer combination in accordance with claim 1, including swivel means integrally formed with said housing for permitting relative angular displacement of one portion of said housing means with respect to another portion of said housing means.

3. A tractor and trailer combination in accordance with claim 2, wherein said housing outlet means is angularly displaceable with respect to said housing inlet means.

4. A tractor and trailer combination as in claim 2, wherein said swivel means comprises a ball bearing joint.

5. A tractor and trailer combination in accordance with claim 4, wherein said ball bearing joint comprises an outer race rigidly secured to a portion of said housing which is integral with said fluid inlet means, an inner race rigidly secured to a portion of said housing which is integral with said fluid outlet means, and ball bearing means intermediate said inner race and said outer race.

6. A tractor and trailer combination in accordance with claim 5, wherein said ball bearing means comprises two coaxially spaced apart circumferential rows of ball bearings.

7. A tractor and trailer combination in accordance with claim 5, including a grease fitting extending through said outer race of said ball bearing joint.

8. A tractor and trailer combination in accordance with claim 1, wherein said first hose means has a larger inside diameter than that of said third hose means.

9. A tractor and trailer combination in accordance with claim 8, wherein said first hose means has an inside diameter approximating six inches and said third hose means has an inside diameter approximating four inches.

10. A tractor and trailer combination in accordance with claim 8, wherein said first hose means has an inside diameter approximating eight inches and said third hose means has an inside diameter approximating six inches.

11. A tractor and trailer combination in accordance with claim 1, wherein at least a portion of said length of pipe is flexible.

12. A tractor and trailer combination in accordance with claim 1, wherein said fifth wheel assembly includes means disposed on said tractor capable of receiving said fifth wheel assembly secured to the underside of said trailer in bearing engagement, means for positionally securing said fifth wheel assembly on the underside of said trailer to said means disposed on said tractor, and said last mentioned means receiving none of the shear forces presented to said fifth wheel assembly.

13. A tractor and trailer combination in accordance with claim 12, wherein said positional securing means comprises pin members.

14. A tractor and trailer combination in accordance with claim 12, wherein said bearing engagement of said means which is disposed on said tractor and said fifth wheel assembly secured to the underside of said trailer permits rotational movement of said fifth wheel assembly in a vertical plane, and said fifth wheel assembly secured to the underside of said trailer including means to permit rotational movement of said fifth wheel assembly in a horizontal plane.

15. The tractor and trailer combination in accordance with claim 14, wherein said fifth wheel assembly secured to the underside of said trailer includes upper support bearings extending downwardly therefrom, said means disposed on said tractor comprises lower bearing brackets, said upper support bearings and said lower bearing brackets being disposed in abutting bearing engagement, and said upper support bearings including lubricating means capable of lubricating the abutting surfaces of said upper support bearings and said lower bearing brackets to thereby facilitate rotational movement thereof about a vertical plane.

16. A tractor and trailer combination in accordance with claim 15, including first and second upper support bearings and first and second lower bearing brackets adapted to be placed in bearing engagement with one another, respectively, each of said upper support bearings including a pair of sidewalls, and said lubricating means comprising grease retaining chambers formed integrally with said upper support bearings and disposed between at least a portion of the sidewalls thereof and means disposed between said grease retaining chambers and said abutting bearing surfaces of said upper support bearings and said lower bearing brackets to permit the flow of grease from said grease retaining chambers to said abutting bearing surfaces.

17. A tractor and trailer combination in accordance with claim 16, wherein the bearing surface of said upper support bearings are of an arcuate concave configuration, the bearing surfaces of said lower bearing brackets are of an arcuate convex configuration, and said means disposed between said grease retaining chambers and said abutting bearing surfaces comprises at least one opening in the arcuate concave bearing surface of said upper support bearings.

18. A tractor and trailer combination in accordance with claim 15, including first and second upper support bearings, first and second lower bearing brackets capable of being placed in bearing engagement with one another, respectively, each of said upper support bearings including a pair of sidewalls, each of said sidewalls having laterally extending openings therein, each of said lower bearing brackets having a laterally extending opening therein, said lower bearing brackets being disposed between said sidewalls of said upper support bearings, respectively, with the openings in said sidewalls being in axial alignment with the openings in said lower bearing brackets, and said positional securing means comprising pin members positioned within said axially aligned openings.

19. A tractor and trailer combination in accordance with claim 18, including retaining means secured to one of said pin members to maintain said pin members in position within said axially aligned openings.

20. A tractor and trailer combination in accordance with claim 18, wherein said laterally extending openings in said lower bearing brackets have a bushing positioned therewithin for absorbing any shock forces which might be imparted to said pin members projecting therethrough.

21. A tractor and trailer combination in accordance with claim 22, wherein
said means for permitting rotational movement of said fifth wheel assembly in a horizontal plane comprises
an annular ball bearing.

22. A tractor and trailer combination in accordance with claim 21, wherein
said fifth wheel assembly secured to the underside of said trailer includes
an upper mounting plate,
a lower mounting plate, and
a structural subframe,
means connecting said annular ball bearing ring between said upper and lower mounting plates,
means connecting said lower mounting plate to said structural frame,
means connecting said upper mounting plate to said underside of said trailer, and
means connecting said upper support bearings to the underside of said structural subframe at opposite sides thereof.

23. A tractor and trailer combination in accordance with claim 22, wherein
said upper mounting plate, said lower mounting plate and said structural subframe have substantially axially aligned openings therewithin which are in substantially axial alignment with the opening in said ball bearing ring, thereby forming an opening extending through the entire fifth wheel assembly which is secured to the front underside of said trailer.

24. A tractor and trailer combination in accordance with claim 23, wherein
said tractor includes a chassis, and
said lower bearing brackets are secured to said chassis of said tractor at opposite sides thereof.

25. A tractor and trailer combination in accordance with claim 12, wherein
said trailer is one of the type having a tank storage body therein capable of storing and transporting fluids,
said tractor being of the type having a flud pump thereon,
said fifth wheel assembly being secured to the underside of said trailer and having an opening extending therethrough,
conduit means extending from said tank body in fluid tight communication therewith,
means connected between said conduit means and said pump to permit fluid flow between said tank and said pump, and
said connecting means being disposed between said opening in said fifth wheel assembly but being separate and apart therefrom.

26. A tractor and trailer combination in accordance with claim 25, wherein
said connecting means is detachably coupled to said pump.

27. A tractor and trailer combination in accordance with claim 26, wherein
said connecting means includes swivel means whereby said connecting means can swivel towards and away from said pump.

28. A tractor and trailer combination in accordance with claim 26, wherein
said bearing engagement of said means disposed upon said tractor and said fifth wheel assembly secured to the underside of said trailer permits rotational movement of said fifth wheel assembly in a vertical plane, and
said fifth wheel assembly secured to the underside of said trailer including means to permit rotational movement of said fifth wheel assembly in a horizontal plane.

29. A tractor and trailer combination in accordance with claim 28, wherein
said fifth wheel assembly secured to the underside of said trailer includes upper support bearings extending downwardly therefrom,
said means disposed upon said tractor comprises lower bearing brackets,
said upper support bearings and said lower bearing brackets are disposed in abutting bearing engagement, and
said upper support bearings including lubricating means capable of lubricating the abutting surfaces of said upper support bearings and said lower bearing brackets to thereby facilitate rotational movement thereof about a vertical plane.

30. A tractor and trailer combination in accordance with claim 29, including
first and second upper support bearings and first and second lower bearing brackets capable of being placed in bearing engagement with one another, respectively,
each of said upper support bearings including a pair of sidewalls,
said lubricating means comprising grease retaining chambers formed integrally with said support bearings and disposed between a portion of the sidewall, and
means disposed between said grease retaining chambers and abutting bearing surfaces of said upper support bearings and said lower bearing brackets to permit the flow of grease from said grease retaining chambers to said abutting surfaces.

31. A tractor and trailer combination in accordance with claim 30, wherein
said bearing surfaces of said upper support bearings are of an arcuate concave configuration,
said bearing surfaces of said lower bearing brackets are of an arcuate convex configuration, and
said means disposed between said grease retaining chambers and said abutting surfaces comprises at least one opening in the arcuate concave bearing surface of said upper support bearing.

32. A tractor and trailer combination in accordance with claim 29, including
first and second upper support bearings,
first and second lower bearing brackets adapted to be placed in bearing engagement with one another, respectively,
each of said upper support bearings including a pair of sidewalls,
each of said sidewalls having a laterally extending opening therein,
each of said lower bearing brackets having a laterally extending opening therein,
said lower bearing brackets being disposed between said sidewalls of the upper support bearings, respectively, with the openings in said sidewalls being in axial alignment with the openings in said lower bearing bracket, and said positional securing means comprises pin members positioned within said axially aligned openings.

33. A tractor and trailer combination in accordance with claim 32, including
retaining means secured to one of said pin members to maintain said pin members positioned in said axially aligned openings.

34. A tractor and trailer combination in accordance with claim 32, wherein
said laterally extending openings disposed in said lower bearing brackets have a bushing positioned therewithin for absorbing any shock forces which might be imparted to said pin members projecting therethrough.

35. A tractor and trailer combination in accordance with claim 34, wherein
said means for permitting rotational movement of said fifth wheel assembly about a horizontal plane comprises an annular ball bearing ring.

36. A tractor and trailer combination in accordance with claim 35, wherein
said fifth wheel assembly secured to the front underside of said trailer includes
an upper mounting plate,
a lower mounting plate, and
a structural subframe,
means for connecting said annular ball bearing ring between said upper and lower mounting plates,
means connecting said lower mounting plate to said structural subframe,
means connecting said upper mounting plate to said front underside of said trailer, and
means connecting said upper support bearings to the underside of said structural subframe at opposite sides thereof.

37. A tractor and trailer combination in accordance with claim 36, wherein
said upper mounting plate, said lower mounting plate and said structural subframe have substantially axially aligned openings therewithin which are in substantially axial alignment with the openings of said annular ball bearing, thereby forming said opening extending through the entire fifth wheel assembly secured to the front underside of said trailer.

38. A tractor and trailer combination in accordance with claim 37, wherein
said lower bearing brackets are secured to the chassis of said tractor at opposite sides thereof.

39. A tractor and trailer combination in accordance with claim 12, wherein
said trailer is of the type having a tank body thereon adapted to store and transport fluids,
said tractor is of the type having a fluid pumping station thereon,
said tank body having a conduit in fluid tight relationship extending downwardly therefrom,
said fifth wheel assembly being secured to the front underside of said trailer having an opening extending therethrough,
said pipe structure including
an upper pipe,
a swivel joint, and
a right angle lower pipe,
said upper pipe having its lower end connected to said swivel joint,
said right angle lower pipe having its upper end connected to said swivel joint,
means connecting said upper end of said upper pipe to the lower end of said conduit extending downwardly from said tank,
detachable means coupling the lower end of said right angle lower pipe to said pump means, and
said pipe structure being disposed within said laterally extending opening in said fifth wheel assembly secured to the front underside of said trailer, but independent, separate and apart therefrom.

* * * * *